R. & B. CRAIN.
SELF FEEDER AND BAND CUTTER FOR THRESHING MACHINES.
APPLICATION FILED FEB. 16, 1911.
1,004,377.
Patented Sept. 26, 1911.
4 SHEETS—SHEET 1.
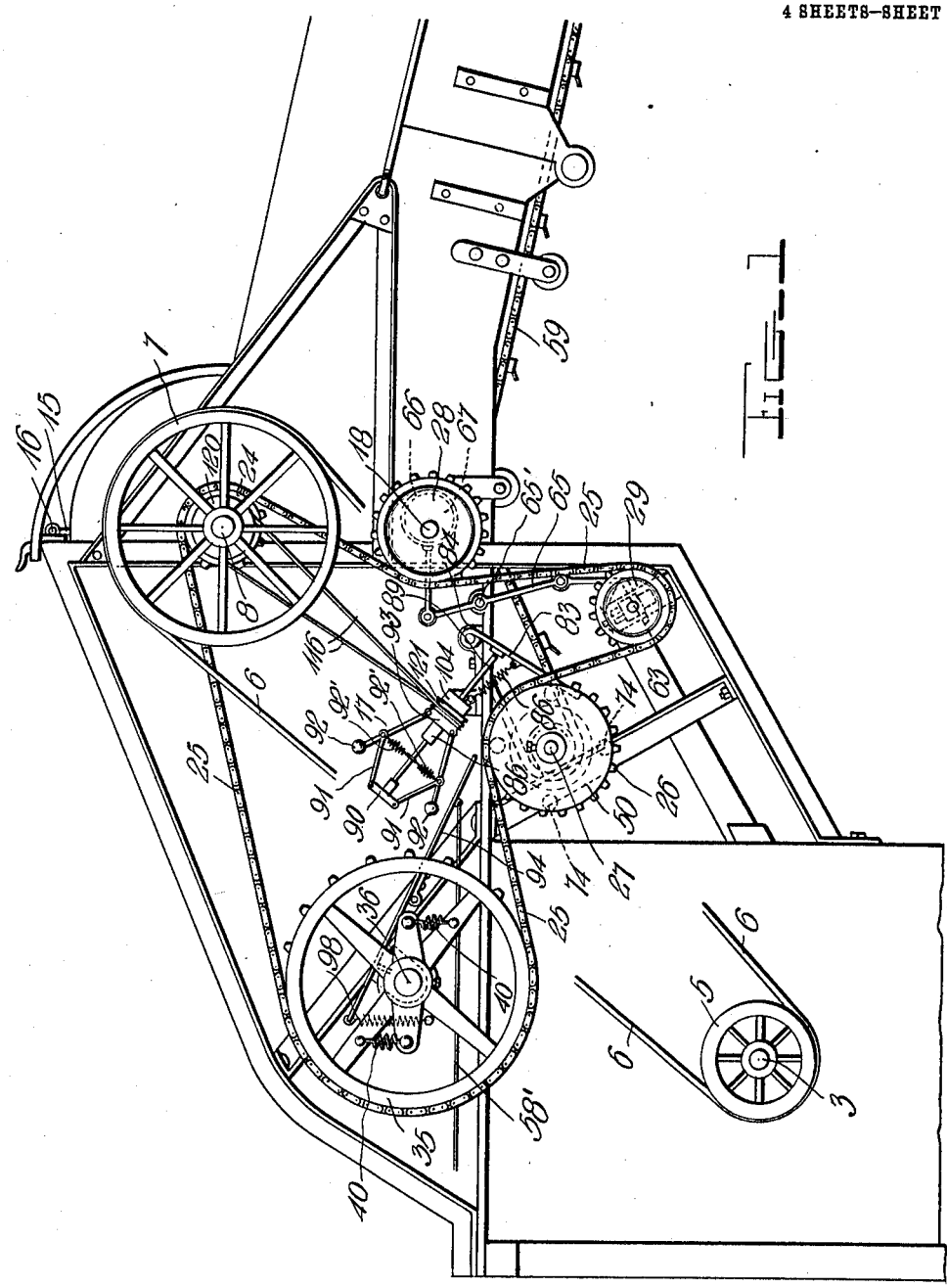
Witnesses
Inventors
Rollie Crain
and Benjamin Crain
by H. B. Willson &Co
Attorneys

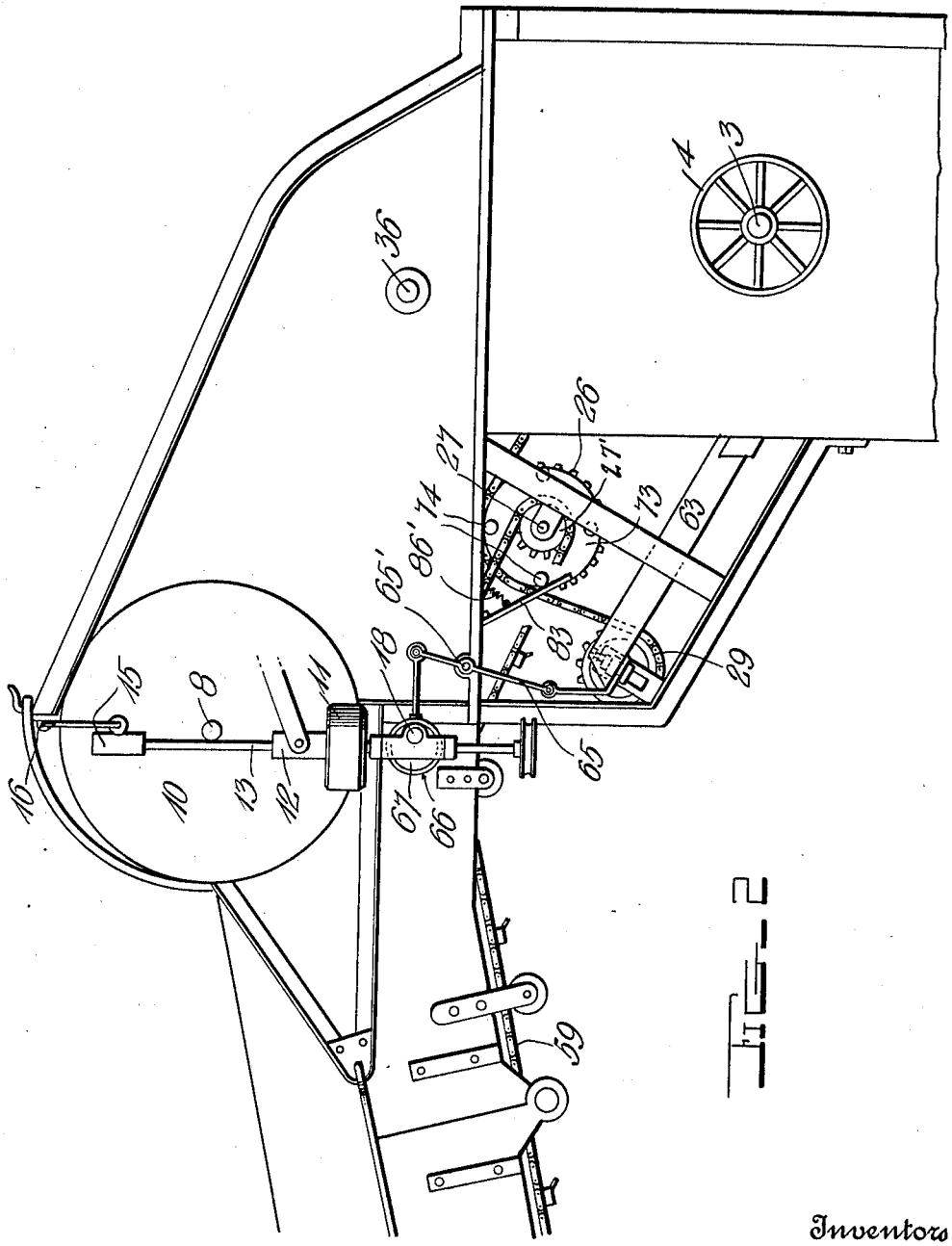

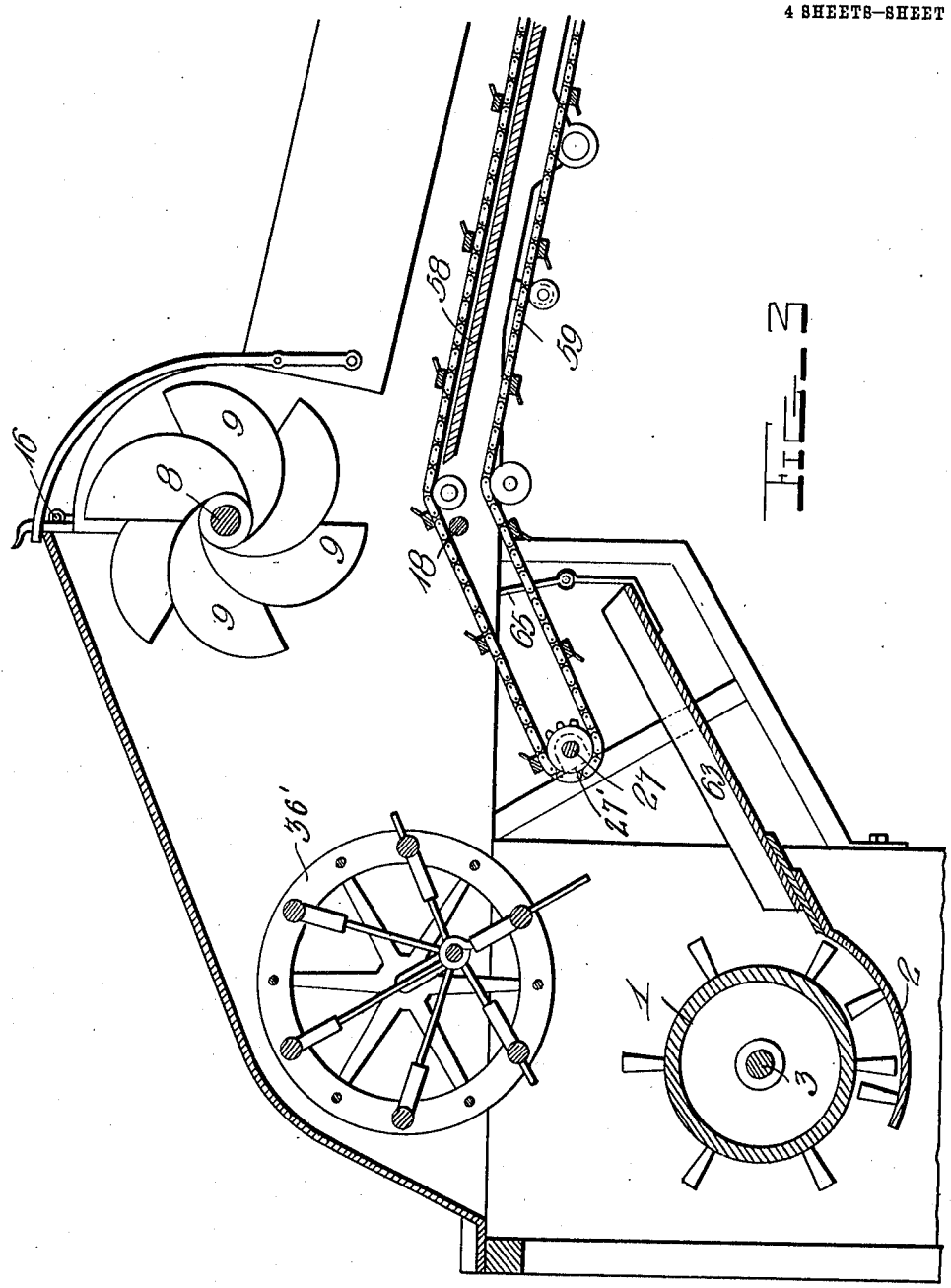

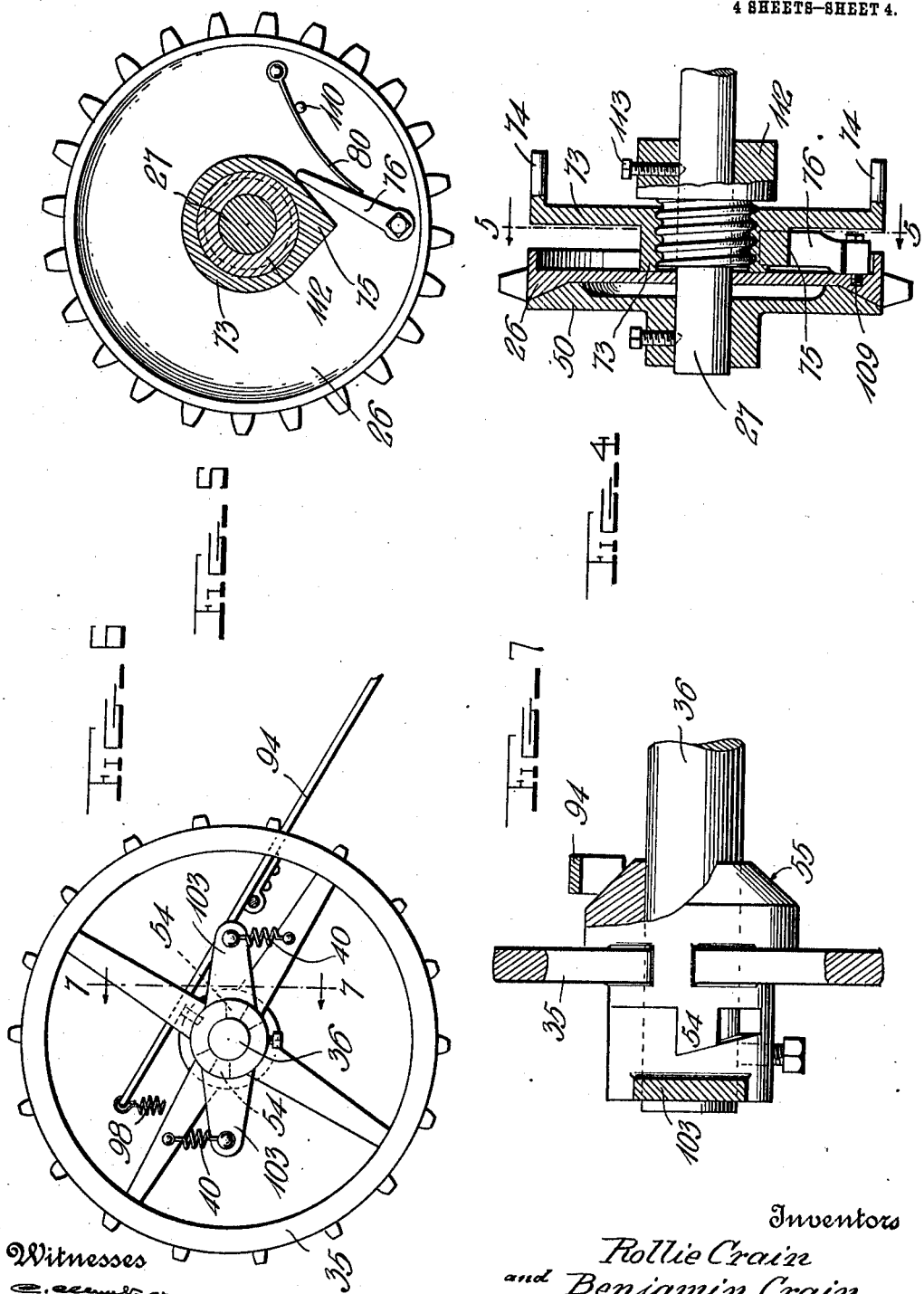

UNITED STATES PATENT OFFICE.

ROLLIE CRAIN AND BENJAMIN CRAIN, OF MARION, ILLINOIS.

SELF-FEEDER AND BAND-CUTTER FOR THRESHING-MACHINES.

1,004,377. Specification of Letters Patent. Patented Sept. 26, 1911.

Application filed February 16, 1911. Serial No. 608,897.

*To all whom it may concern:*

Be it known that we, ROLLIE CRAIN and BENJAMIN CRAIN, citizens of the United States, residing at Marion, in the county of Williamson and State of Illinois, have invented certain new and useful Improvements in Self-Feeders and Band-Cutters for Threshing-Machines; and we do declare the following to be a full, clear, and exact description of the invention, such as will enable others skilled in the art to which it appertains to make and use the same.

This invention relates to improvements in self feeders and band cutters for threshing machines, and is especially designed as an improvement over our Patent No. 977,599, dated December 6, 1910.

One object of the invention is to provide means operable by the feeding cylinder for controlling the conveyer.

Another object is to provide auxiliary controlling means for the conveyer operable by a speed governor in combination with a friction clutch.

A still further object is to provide improved means for driving the machine.

With these and other objects in view, the invention consists of certain novel features of construction, and the combination and arrangement of parts as will be more fully described and claimed.

In the accompanying drawings: Figure 1 is a side elevation of one side of the upper portion of a threshing machine embodying these improvements and with the centrifugal governor shown in inoperative position. Fig. 2 is a similar view of the other side of the machine; Fig. 3 is a vertical longitudinal section; Fig. 4 is a detail vertical longitudinal sectional view through one end of the conveyer shaft and its connected parts; Fig. 5 is a transverse vertical section taken on the line 5—5 of Fig. 4; Fig. 6 is a detail front elevation partly in section of the wheel 35 and adjacent parts; Fig. 7 is a detail vertical section on line 7—7 of Fig. 6.

In the embodiment illustrated, a threshing cylinder 1 is shown arranged in the machine in the usual or any desired manner in position to coact with a concave 2, of any suitable structure. The shaft 3 of the cylinder 1 is mounted in the frame of the machine and projects beyond the opposite sides thereof, and is provided on one end with a drive pulley 4 adapted to be connected with any suitable operating mechanism. A drive pulley 5 is fixed to the other end of the shaft 3 and is connected by a belt 6 to a drive pulley 7 fixed to one end of a cutter operating and power transmitting shaft 8 which extends transversely through the upper portion of the machine and is revolubly mounted in suitable bearings in the sides thereof. On the shaft 8 and immediately over the grain conveying or feeding mechanism is arranged a series of segmental band cutting blades 9, said blades projecting radially from and in different positions on the shaft 8.

On the opposite end of the shaft 8 from the pulley 7 is fixedly mounted a friction driving disk 10 with the flat outer face of which is engaged a friction drive gear 11. The gear 11 is provided with an elongated hub 12 and is keyed to slide on a vertically disposed shaft 13, the upper end of which is revolubly mounted in a sleeve 15 on the cranked outer end of a rock shaft 16, which is journaled in suitable bearings in the upper portion of the frame of the machine, as clearly shown in Figs. 2 and 3 of the drawings, but as this forms no part of the present invention and is fully described in our patent above referred to, no further description thereof will be given here.

A sprocket wheel 24 is keyed to the shaft 8 to be rotated therewith, and can be exchanged for sprocket wheels of different diameters for varying the speed of the feeding mechanism as desired. A sprocket chain 25 extends around the sprocket wheel 24 and around a sprocket wheel 35 and then over another sprocket wheel 26 and around an idler sprocket 29, then over a sprocket wheel 28 from which the feeding mechanism receives motion. A grooved pulley 120 is also mounted on the shaft 8 and is designed to drive a speed or centrifugal governor 17 by means of a belt 116 which passes around a grooved pulley 121 connected with said governor, as will be hereinafter more fully described. The band cutter shaft 8 when rotated imparts motion to all parts of the feeding and band cutting mechanism the operation of the conveyer being controlled by a friction clutch mechanism hereinafter described.

The sprocket wheel 28 is fixed upon a shaft 18, to which motion is transmitted by means of the belt or sprocket chain 25. Two eccentrics as 67 are mounted upon opposite ends of the shaft 18, and eccentric straps as 66 are attached to each of the eccentrics as 67. The tails of the eccentric straps 66 are attached to the upper ends of rocker arms 65, which are pivoted intermediately of their ends upon the frame of the machine, as shown at 65'. A grain pan 63 is attached to the lower ends of the rocker arms 65 and is reciprocated thereby, said pan being arranged in position to catch the loose grain from the deck and deliver it to the threshing cylinder.

The sprocket wheel 26 is loosely mounted on a transversely arranged shaft 27, and this sprocket wheel 26 is designed to operate through the friction clutch to be described, to impart motion to shaft 27, which operates the conveyer. The sprocket wheel 35 is attached to the outer end of the shaft 36 of the feeding cylinder 36', (see Fig. 3). A cross head 103 is also attached to the trunnion 36, and two coiled springs as 40 are connected at one end to the opposite ends of said head and at their other ends to the sprocket wheel 35 for a purpose to be described.

The sprocket wheel 29 is mounted in an adjustable bearing and is merely for taking up the slack in the chain 25 as it becomes loosened by wear, and to cause said chain to be brought into working contact with the wheels 26 and 28.

The centrifugal speed governor 17 is preferably constructed of weights as 92 connected by springs 92' and mounted on hingedly connected arms as 91. Heads 90 and 93 connect the free ends of the arms 91, and a grooved pulley 121 is attached to the head 90 by means of which motion is imparted from the belt 116 to the governor. A rod 89 passes through a bearing 104 on a sleeve 86 on which the pulley 121 and the head 90 are mounted. The upper end of this rod 89 is secured to the head 93 and the governor being set in motion by centrifugal force on the turning of the pulley by the belt 116 which receives its motion from the shaft 8, the weights 92 swing outward and carry with them the hingedly connected arms 91, which causes the head 93 to be moved inward and the free end of the rod 89 bears on a lever 83 and forces the free end of said lever out of the path of the trip collar lugs hereinafter to be described whereby said governor is disengaged from the friction clutch mechanism to be described. This lever 83 is fulcrumed at one end on a stationary bearing 84 and when the centrifugal governor is in operation the free end thereof projects into the path of the trip collar lugs above referred to, by means of which the governor 17 is disengaged from the friction clutch mechanism, and the conveyer to be described thrown into operation as will be hereinafter more fully described. A friction pawl 76 is attached at one end to the inner face of the wheel 26, preferably by means of a screw 109. A flat spring 80 is also attached at one end to the inner face of the wheel 26 and at its free end is engaged with the pawl 76 and held yieldably thereagainst by means of a pin 110 which projects laterally from the inner face of the wheel 26 and exerts a tension on said spring.

The trip collar 73 is mounted on the shaft 27 adjacent the inner face of the wheel 26. The hub thereof is screw threaded internally and mounted on an exteriorly screw threaded hub of a collar 112 fixed to the shaft 27, preferably by means of a set screw 113. The hub of the collar 73 is also provided on its periphery with a cam projection 75, preferably having inclined opposite faces, and over which the free end of the pawl 76 is designed to be moved for a purpose to be described. This trip collar 73 is provided with a plurality of laterally extending inwardly projecting lugs or fingers 74 in the path of which the lever 83 is adapted to be forced when the centrifugal governor 17 is out of operation. A friction plate 50 is fixed to the outer end of the shaft 27 and is adapted to bear against the outer face of the sprocket wheel 26, as shown clearly in Fig. 4, and is adapted to be rotated with the shaft 27, the wheel 26 being loosely mounted on said shaft.

The grain conveying mechanism comprises a deck 58, which is preferably arranged at an angle within the machine, and around which is adapted to travel a slatted conveyer belt or rattle 59 which passes around suitable sprocket gears 27' on the conveyer operating shaft 27 and over suitable guide pulleys at opposite ends of the deck. The grain pan 63 is arranged below the discharge end of this conveyer, and as already stated, is designed to catch the grain from the deck and deliver it to the threshing cylinder.

As hereinbefore stated, the drive sprocket 26 is loosely mounted on the conveyer operating shaft 27, and said gear is adapted to be operatively connected with said shaft by the automatically operating clutch mechanism comprising the pawl 76, disk 50, trip collar 73 and the collar 112. When the governor 17 is disengaged from the friction clutch mechanism and the wheel 26 is in motion, the pawl 76 carried thereby is slidably engaged with the circumference of the hub of the trip collar 73, and is caused to be dragged around said hub to come in contact with the cam-like projection 75. In passing over this cam 75 the free end of the pawl 76 is thereby swung outward, which produces a greater tension upon the spring 80, the spring thus causing a greater resistance to be offered to the pawl 76 in passing over the cam 75. This engagement of the pawl with the cam causes the trip collar 73 to be partially unscrewed from the hub of the set collar 112, and in so doing a pressure is exerted thereby upon the inner face of the wheel 26 against which the hub of the trip collar bears. Pressure is also created between the friction plate 50 and the outer face of the wheel 26 whereby said wheel 26 is firmly clamped between the hub of the collar 73 and the friction plate, both of which are secured to the shaft 27, the collar 73 being indirectly connected to said shaft by means of the collar 112, and the chain 25 passing over said wheel 26 imparts motion thereto and causes the shaft 27 to be rotated and the conveyer 59, which passes over the sprocket gears 27' on said shaft 27, to be set in motion. When the feed of the thresher is decreased to a determined point, the centrifugal governor 17 is thrown out of operation and the weights 92 thereof swung inward and cause the head 93 and the rod 8 connected therewith to move upwardly thereby reducing the pressure of the free end of said rod 89 against the lever 83 which permits a spring 86' to swing the lever 83 inward and engage its free end with the lugs 74 of the trip collar 73 and thereby screw the collar 73 inward on collar 112 and unclamp the gear 26 thereby throwing the conveyer out of operation.

In order that the feeding of the conveying mechanism may be started and stopped at a given rotative or threshing speed of the threshing cylinder, the centrifugal governor is provided with the coiled spring 86', one end of which is attached to the bearing 104 and its other end to the lever 83 by any suitable means. It is obvious that when the weights of the governor return to normal position on the lowering of the speed of the threshing cylinder, the spring 86' will exert its tension to force the lever 83 upward and cause the free end thereof to engage the lugs 74 of the trip collar 73 and prevent said collar from being rotated whereby the hub of the collar 112 is screwed into the collar 73 thereby releasing the friction clutch mechanism from the wheel 26 of the shaft 27 and out of operation the conveyer. In order that the conveyer may also be controlled by the feeding cylinder 36' as it comes in contact with the grain as it passes to the threshing cylinder, the wheel 35 is loosely and slidably mounted upon the shaft 36 and is attached to the cross head 103 by means of the springs 40, said cross head being securely fixed to the trunnion 36. If for any reason resistance is offered to the rotation of the feeding cylinder, the wheel 35 by means of the springs 40 is permitted to rotate partially upon the trunnion 36. The hub of this wheel 35 is provided with two cam projections as 54, which are arranged in slidable contact with the hub of the cross head 103, as shown clearly in Fig. 7, the wheel 35 being thus caused to be shifted upon the trunnion 36. On the face of the wheel opposite the cams 54, the hub is preferably made cone-shaped, as shown at 55. A lever 94 is fulcrumed intermediately of its ends, and one end thereof is arranged adjacent the cone-shaped end 55 of the hub of the wheel 35, the other end of said lever extending adjacent the trip collar 73 and being adapted to be swung in the path of the lugs 74 when the wheel 35 is moved inward upon the trunnion 36, which causes the cone-shaped end 55 thereof to engage the beveled face on the adjacent end of the lever 94, thus lifting this end of the lever up and causing its other end to be swung downwardly into the path of the lugs 74 of the trip collar 73.

When the free end of the lever 94, or of the lever 83 is brought into the path of the lugs 74 of the trip collar 73, while the shaft 27 and the friction clutch mechanism are in motion, the rotation of the trip collar 73 is interrupted, and the shaft 27, collar 112, wheel 26 and friction plate 50 continue to rotate, which causes the hub of the collar 112 to be screwed into the hub of the collar 73, thereby reducing the pressure upon the opposite faces of the wheel 26, which permits said wheel to be revolved on the shaft 27, and the motion of the shaft is consequently stopped and the conveyer is thrown out of operation.

If for any reason the resistance to the rotation of the feeding cylinder is decreased while the springs 40 are under tension, the springs will cause the feeding cylinder to be partially rotated and the wheel 35 to be shifted longitudinally upon the trunnion 36, thereby keeping the hub of the wheel slidably engaged with the hub of the cross head 103, moving the cone-shaped end 55 of said wheel outward away from the adjacent end of the lever 94 whereby said lever under the action of a coiled spring 98 is pulled down into yielding contact with the cone-shaped end 55 and the other end of said lever lifted out of the path of the lugs 74 of the trip collar 73, and the friction clutch mechanism is again thrown into operation and the conveyer started.

In order that the ends of the levers 83 and 94 which come in contact with the lugs 74 may be free to respond to the action of the spring 98 and to the speed governor at intervals during the rotation of the wheel 26 the trip collar 73 is caused to make a partial rotation in the opposite direction to that of the wheel 26 by means of the friction pawl 76 which is drawn over the cam 75 of the trip collar 73. The free ends of the levers 83 and 94 are also released at intervals from the pressure exerted upon them by the lugs 74 of the trip collar in order that the feeding mechanism may be controlled at a very slight variation of a given threshing speed of the threshing cylinder.

To permit the conveyer 59 to be controlled at the will of the operator, a flexible element 58' is attached to the lower end of the lever 94, and a pull is exerted upon said element to cause the free lower end of the lever 94 to be swung into the path of the lugs 74 of the trip collar 73 to throw the conveying mechanism out of operation. When the pull on the element 58 is released, the spring 98 will withdraw the lever 94 out of the path of the lugs 74 and the friction clutch mechanism is again thrown into operation and the conveyer started.

We claim as our invention:

1. In a feeding device for threshing machines, a drive shaft, a conveyer operating shaft, having a screw threaded portion, an automatically operating clutch mechanism, the same comprising a drive sprocket wheel loosely mounted on said conveyer shaft adjacent to the screw threaded portion thereof, a friction disk fixed to said shaft adjacent to one face of the sprocket wheel, means adjustable on the screw threaded portion of the shaft and operable by turning of said wheel to cause the disk to engage with the same and fix it to the shaft whereby the conveyer is actuated, an arm adapted to swing into the path of said wheel clutch mechanism, and means operated by the drive shaft for moving said arm into position to engage the wheel clutch mechanism thereby disengaging said mechanism from said wheel and thereby throwing the conveyer shaft out of operation.

2. In a feeding device for threshing machines, a drive shaft, a conveyer operating shaft, having a screw threaded portion, an automatically operating clutch mechanism, the same comprising a drive sprocket wheel loosely mounted on said conveyer shaft adjacent to the screw threaded portion thereof, a friction disk fixed to said shaft adjacent to one face of the sprocket wheel, a trip collar rotatably mounted upon the screw threaded portion of said trip collar, a pawl movably secured to the sprocket wheel and adapted for engagement with the cam portion of the trip collar, a spring for holding said pawl in contact with the cam, means adjustable on the screw threaded portion of the shaft and operable by turning of said wheel to cause the disk to engage with the same and fix it to the shaft whereby the conveyer is actuated, an arm adapted to swing into the path of the clutch mechanism thus constructed, and means operated by the drive shaft for moving said arm into position to engage the wheel clutch mechanism thereby disengaging said mechanism from said wheel and thereby throwing the conveyer out of operation.

In testimony whereof we have hereunto set our hands in presence of two subscribing witnesses.

ROLLIE CRAIN.
BENJAMIN CRAIN.

Witnesses:
C. C. DAVIS,
W. L. MILLER.